Figure 1:
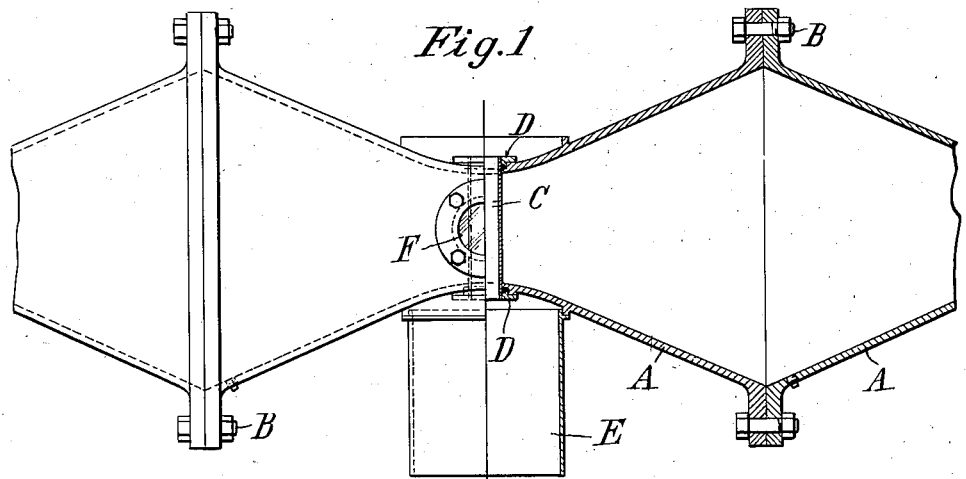

M. VON RECKLINGHAUSEN.
STERILIZING APPARATUS.
APPLICATION FILED JAN. 18, 1915.

1,156,948.

Patented Oct. 19, 1915.

Witnesses:
Thomas J. Byrne
William P. Johnson

Max von Recklinghausen,
Inventor

By his Attorneys
Kerr, Page, Cooper & Hayward

UNITED STATES PATENT OFFICE.

MAX VON RECKLINGHAUSEN, OF NEW YORK, N. Y.

STERILIZING APPARATUS.

1,156,948.  Specification of Letters Patent.  Patented Oct. 19, 1915.

Application filed January 18, 1915. Serial No. 2,796.

*To all whom it may concern:*

Be it known that I, MAX VON RECKLINGHAUSEN, a subject of the Emperor of Germany, residing at New York, in the county and State of New York, have invented certain new and useful Improvements in Sterilizing Apparatus, of which the following is a full, clear, and exact description.

In systems for the sterilization of water by means of ultra-violet rays, and particularly where large amounts of water are to be treated, as in municipal water-supply plants, it is customary to cause the water undergoing treatment to flow in a continuous stream through regions or fields of such rays, and for the purpose of securing a more perfect and complete action of these rays, the sources from which they emanate are placed at more or less contracted portions of the channel through which the water flows, so that the latter is brought close to the sources of rays, and experiences the full effect of the same.

The invention which forms the subject of this application is an improvement in such systems, and involves, a novel construction of the conduit through which the water passes. The apparatus is composed of a plurality of sectional units, all alike in design and dimensions, and each of which comprises a vessel or container with a sterilizing tube therein, together with the necessary lamp chamber and lamp. The walls of the sterilizing tubes or chambers are transparent to ultra-violet rays, and one or more of these chambers are placed at a contracted portion of each of the units. Two or more of these units may be connected together, by the use of conventional joints, such as flanges, masses of cement, or the like, in series, so as to constitute a passage for the water, with any desired number of sterilizing stations through which the water must successively pass, the number of such units depending upon the conditions and necessities of use in each particular case.

The essential feature of my invention resides in the special manner in which these units are constructed, in order to avoid the objectionable consequences arising from the presence in the water of air-bubbles. It is well known that a body of flowing water, particularly when under conditions of varying pressure, is liable to contain a large quantity of air in the form of bubbles more or less minute, and that the presence of these bubbles prevents the sterilization of the water by the action thereon of ultra-violet rays projected into it, the air-bubbles acting like a suspended solid impervious to the rays that shadow the germs.

I have found that the effect of such bubbles may be practically overcome by so designing the channel through which the water flows, or by so constructing each unit thereof along the upper portion of such channel and above the region directly permeated by the rays that there shall be a straight and unimpeded path into which the air-bubbles may rise, and along which they may flow, notwithstanding the successive enlargements and contractions of the channel as a whole.

In the annexed drawing I have illustrated the construction of my improved sterilizing apparatus in the form in which it is most applicable to municipal plants.

Figure 2:
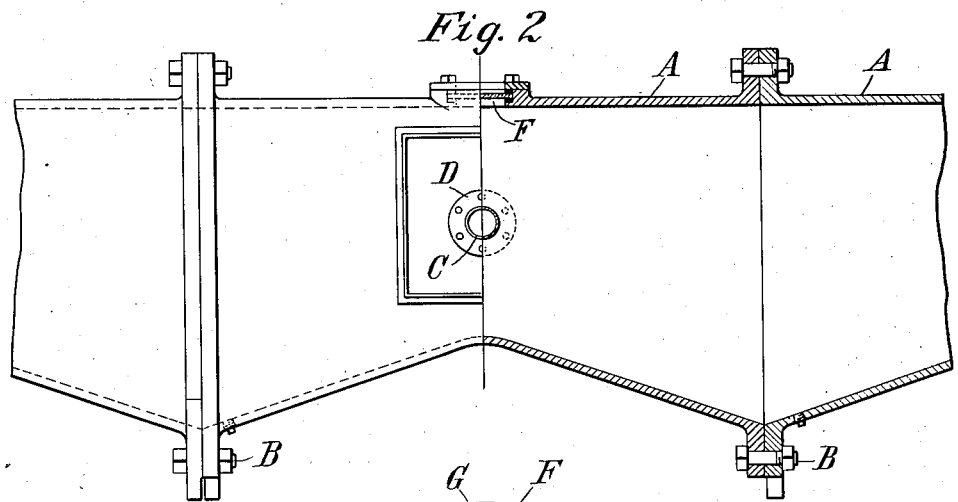
Figure 3:
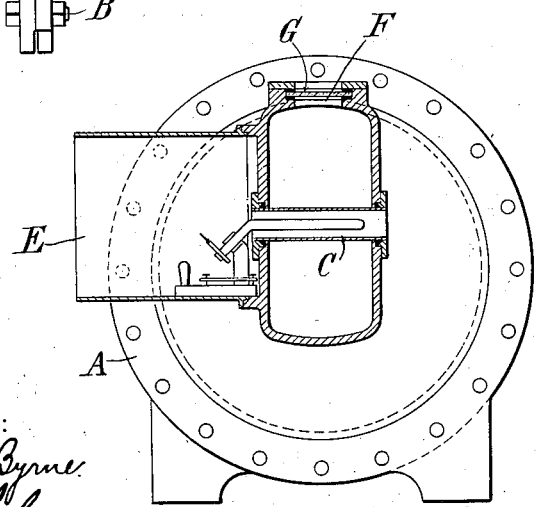

Figure 1 is a top plan view of a section of the channel with its various appurtenances. Fig. 2 is a vertical central section of the same; and Fig. 3 is a vertical cross-section through one of the contracted portions of sterilizing stations.

Each unit consists of a casting A with enlarged circular ends and a central contracted portion. It is straight along the top, as shown in Fig. 2, and narrows up from the bottom and sides, and the ends are formed with flanges which serve as the means for uniting the two sections by means of bolts B.

Across the narrow portion of the unit, a quartz tube or chamber C is inserted, and secured thereto by rings D with a suitable packing to form water-tight joints. To the side of the unit there is also secured a lamp box or chamber E for containing the ultra-violet lamp of any usual pattern, which projects into the quartz tube C. I have shown the lamp box as on one side only, but this is for convenience, as there might be one on either side, if so desired.

At the top of the unit, immediately over the quartz tube, is a hand or peep hole F, which is preferably covered by a transparent glass plate G.

In using this device, as many of the said units as may be necessary are secured together end to end, and the conduit thus formed connected with a water supply. The suction and pressure upon the line develops in the water air-bubbles, which, as has been pointed out before, would interfere with the action of the luminous rays in sterilizing the water, were it not for the fact that the top of the conduit is straight and forms an uninterrupted space or path into which the air-bubbles rise, and along which the air travels, without shadowing any of the germs in the body of water that is directly exposed to the action of the rays emanating from the lamps and passing through the quartz tubes.

In the drawing I have not illustrated any means for agitating the water, such as baffles, but it will be understood by those skilled in this art that any such devices may be used when necessary or desirable, provided they do not destroy or impair the continuity of the straight path along the top of the conduit.

By making the device in units, as described, great advantages are secured. A line of any length needed may be readily secured, a defective section may be at once replaced, and greater economy in manufacturing is obtained.

What I claim is:

1. An apparatus for sterilizing fluids, comprising, in combination, a channel or conduit with contracted portions, but with an air pass or path along its top unobstructed at its upper side, chambers with walls transparent to ultra-violet rays located at the contracted portions, and ultra-violet lamps contained in such chambers.

2. An apparatus for sterilizing, comprising, in combination, a channel or conduit with contracted portions, but with a path along its top unobstructed at its upper side, and composed of sectional units adapted for connection in series, and each containing a contracted part, chambers with walls transparent to ultra-violet rays contained in the contracted parts, and ultra-violet lamps within said chambers.

3. A sectional unit for a sterilizing apparatus, comprised of a section of a channel or conduit having a contracted portion, but a path along its upper side unobstructed along its top, in combination with means at its ends for attachment to another section, and a chamber with walls transparent to ultra-violet rays located in the contracted part.

4. A sectional unit for a sterilizing apparatus, comprising in combination a section of a conduit having a contracted part but straight along its upper side, means at its ends for attachment to another section, a chamber or tube extending through the contracted part with walls transparent to ultra-violet rays, and a lamp box secured to the side of the section over the opening of said tube or chamber.

5. A sectional unit for sterilizing apparatus, comprising in combination, a section of a conduit having a contracted portion, but straight along its upper side, means at its ends for attachment to another section, a chamber extending through the contracted part with walls transparent to ultra-violet rays, a lamp box secured to the section over the opening of said chamber, and a hand or peep hole over said chamber.

In testimony whereof I affix my signature in the presence of two subscribing witnesses.

MAX von RECKLINGHAUSEN.

Witnesses:
M. LAWSON DYER,
THOMAS J. BYRNE.